US006452289B1

(12) United States Patent
Lansberry et al.

(10) Patent No.: US 6,452,289 B1
(45) Date of Patent: Sep. 17, 2002

(54) GRID-LINKED POWER SUPPLY (75) Inventors: Geoffrey B. Lansberry, Hingham, MA (US); Evgeny N. Holmansky, Acton, MA (US)

(73) Assignee: SatCon Technology Corporation, Cambridge, MA (US)

( * ) Notice: Subject to any disclaimer, the term of this patent is extended or adjusted under 35 U.S.C. 154(b) by 0 days.

(21) Appl. No.: 09/612,996

(22) Filed: Jul. 10, 2000

(51) Int. Cl.$^7$ .................................................. H02J 9/06
(52) U.S. Cl. .......................... 307/25; 307/44; 307/64; 700/295
(58) Field of Search .................... 307/25, 44, 46, 307/48, 59, 64, 72, 73, 74, 75, 76, 80, 87; 323/351; 363/34; 700/295

(56) References Cited

U.S. PATENT DOCUMENTS

| | | | | |
|---|---|---|---|---|
| 4,315,163 A | * | 2/1982 | Bienville | 307/66 |
| 4,634,888 A | | 1/1987 | Deavenport | 307/48 |
| 4,686,375 A | * | 8/1987 | Gottfried | 290/2 |
| 4,731,547 A | * | 3/1988 | Alenduff et al. | 290/2 |
| 4,827,151 A | | 5/1989 | Okado | 307/66 |
| 5,229,650 A | | 7/1993 | Kita et al. | 307/66 |
| 5,880,536 A | * | 3/1999 | Mardirossian | 307/38 |
| 5,886,417 A | * | 3/1999 | Oka et al. | 290/52 |
| 6,093,975 A | * | 7/2000 | Peticolas | 290/52 |
| 6,134,124 A | * | 10/2000 | Jungreis et al. | 363/34 |
| 6,194,794 B1 | * | 2/2001 | Lampe et al. | 307/66 |
| 6,208,040 B1 | * | 3/2001 | Mardirossian | 307/38 |
| 6,219,623 B1 | * | 4/2001 | Wills | 307/45 |
| 6,282,104 B1 | * | 8/2001 | Kern | 363/34 |
| 6,285,178 B1 | * | 9/2001 | Ball et al. | 323/351 |
| 6,288,456 B1 | * | 9/2001 | Cratty | 307/64 |
| 6,304,006 B1 | * | 10/2001 | Jungreis | 307/64 |

FOREIGN PATENT DOCUMENTS

WO WO 01/54249 A1 * 7/2001 ............. H02J/9/04

OTHER PUBLICATIONS

Wind Trubine Industries Corp., "Grid Intertie System Brochure", 1999.*
Watts, James; "Hybrid Fuel–Cell Development Complemented by NREC Specialized Turbomachinery Technologies", Summer 1998, NREC News, vol. 12, issue 2, pp. 1–6.*

* cited by examiner

Primary Examiner—Stephen W. Jackson
Assistant Examiner—Roberto J. Rios
(74) Attorney, Agent, or Firm—Dike, Bronstein, Roberts & Cushman, Intellectual Property Group; George W. Neuner; George W. Hartnell, III (57) ABSTRACT

A grid-linked power supply is described. An inverter, at least one distributed energy source to meet normal, non-peak power demand, a connection to a public utility grid to meet peak power demand requirements, and a converter for regulating delivery of power from the distributed energy source or the public utility grid are connected by bus lines. A topology for the grid-linked power supply has an inverter and a DC/DC converter that is connected to the distributed energy source. The inverter and converter are connected by bus lines, and a bias voltage is provided to select drawing power from the distributed energy source or the public utility grid.

20 Claims, 5 Drawing Sheets

GRID-LINKED POWER SUPPLY

FIELD OF INVENTION

The present invention relates to an economical power supply topology, which provides 100 percent of the required power to residential, commercial or industrial consumers, and that, further, protects consumers from power surges, dips, and outages; and, more particularly, to a on-site, grid-linked distributed electricity generation power supply topology that draws power for normal operation from fuel cells and/or other alternative energy sources, relying, on power from a public utility grid, which is coupled to an inverter through the direct current bus rather than in parallel with the inverter, to meet abnormal or anomalous peak power demand.

BACKGROUND OF THE INVENTION

Foreseeable energy shortages from conventional electrical power sources and global concerns about the environment have sparked greater interest in alternative energy sources. These alternative sources include fuel cells, which produce electrical power by electrochemical reactions, and other means that produce power from wind or wave action, photovoltaic (solar) cells, micro-turbines et cetera. Unlike fossil fuels, renewable energy sources, such as wind power, wave power and solar power, are inexhaustible and environmentally friendly. However, power generated by wind, waves or the sun is highly dependent on weather and meteorological conditions; thus, subject to interruption. Fuel cells are relatively clean and efficient; however, they are limited to a design load and have a relatively slow response time. Thus, fuel cells cannot respond immediately to sharp increases in demand. Batteries, which have an immediate response time, store rather than produce energy hence are only good until the battery has drained. Moreover, battery cost is directly proportional to the stored energy needed. In the existing application, batteries are used to provide peak power, and a fuel cell is used to provide the continuous power, as well as to keep the battery charged.

Two methods exist for providing distributed power, which is defined as modular electrical generation or storage at or very close to the point of use, to consumers from alternative energy sources, such as fuel cells, batteries, wind turbines, etc. The first means is by grid independent architecture, which implies that distributed power delivered comes completely from the output power of an inverter, which converts energy from at least one fuel cell, battery, and/or other alternative power source into alternating current. Inherent in grid independent architecture is a need for sufficient distributed power to supply maximum, or peak, current demand. Hence, to be effective, the sum of the power capabilities of all of the connected energy sources, including fuel cells, batteries or other alternative energy sources must be designed to provide peak power on a worst-case basis, even though peak power demand may only occur, if at all, a few times a year and, even then, relatively briefly. Also, energy generating sources must be sized for the maximum continuous load the system would ever deliver—an expensive proposition considering the low frequency of such an occurrence. Typically, what is done is to size only the battery energy conversion equipment for this high power case, which works for very short periods of time at high load, within the limits of battery energy storage. Consequently, grid independent architecture suffers from over design and is inherently less economical and less cost efficient than the second means, which is to say grid parallel architecture.

Grid independent architecture, further, cannot satisfy demand in excess of the demand for which it was designed. So, abnormal or anomalous demands that exceed the design peak demand may overtax a grid independent architecture.

The alternative to grid independent architecture is grid parallel architecture. Grid parallel architecture delivers distributed power from a fuel cell, battery or other alternative energy source as well as power from a public utility grid. The redundancy of the two power sources, which are parallel systems, provides the ability for the power supply to deliver a constant level of power at its output. This is most beneficial when the source of power is unpredictable, such as solar. In the case of solar, it is a rare event when the load power matches available power. In this case, if the distributed power source cannot provide sufficient power to meet demand, power from the utility grid makes up the difference. Hence, alternative energy sources do not have to be designed for a worst case scenario. Furthermore, the utility grid provides redundancy and peak capability to the alternative energy source. Hence, there is a cost saving in not providing redundant fuel cell, battery, and/or other alternative energy source, which would only operate during abnormal or peak demand.

Another advantage of a grid parallel topology is that utility grid absorbs surplus power generated by the distributed power source, which surplus power is available to help meet peak demands elsewhere on the public utility's network.

However, the consequence of grid parallel topology is a requirement for inter-connection between the inverter of the distributed power source and the utility grid. A recent study by the National Renewable Energy Laboratory entitled "Making Connections: Case Studies of Interconnection Barriers and their Impact of Distributed Power Projects", which is incorporated herein by reference, highlighted the technical, business-practice and regulatory barriers to the interconnection of an alternative energy source distributed power source and a public utility grid. Technical barriers to interconnection include, without limitation, personnel safety, power quality, operation of the local distribution system, and compatibility with the utility grid and grid operation. Business-practice barriers include, without limitation, lengthy contractual and procedural requirements, application fees, insurance requirements, and operational requirements, all of which consume time and increase the cost of installing a distributed power alternative energy source. Finally, regulatory barriers include, without limitation, absolute prohibition, disincentives in the form of discounted energy from the public utility, special fees and tariffs, and environmental permitting. There are no national, or federally mandated, standards for the application process; hence, each public utility may have unique fees, rules, approval processes, and specifications for permitting power generation into a utility grid, potentially requiring multiple applications to a myriad of public utilities. Additionally, as provided above, some public utilities do not compensate or unfairly under-compensate consumers for surplus power supplied into the utility grid.

Therefore, a need exists for a distributed power-generating source that benefits from many of the advantages offered by both a grid independent and a grid parallel topology. Such a solution should reduce the cost and delay associated with regulatory, contractual and procedural requirements while simultaneously providing power more reliably, by virtue of the ability to draw power from the grid, and more efficiently and more cost effectively, by sizing the alternative energy source for only normal demand. In addition it is desirable for the owner of the distributed generator to have a feeling of independence from the utility grid.

In this setting, it would be desirable to provide a grid-linked power supply ("GLPS"), comprising a distributed power source comprising fuel cells, and/or other alternative energy sources, that is intermediate to grid independent and grid parallel architectures. Indeed, it would be particularly desirable to provide a GLPS, wherein the alternative energy source provides continuous demand load, relying on clean, efficient, and economical fuel cells, and/or other alternative energy sources for normal power demands and, further, on a public utility grid for peak, abnormal or anomalous power requirements. Furthermore, it would be desirable to provide a GLPS that does not require public utility approval or other regulatory permitting generally associated with interconnection of a distributed power source with a public utility grid.

SUMMARY OF THE INVENTION

Thus, the present invention provides a grid-linked power supply comprising an inverter, at least one distributed energy source, e.g., a fuel cell, to meet normal, non-peak power demand, a connection to a public utility grid to meet peak, abnormal or anomalous power demand requirements, and a converter for regulating delivery of power from the distributed energy source or the public utility grid.

Preferred embodiments of the present invention provide a grid-linked power supply that more reliably provides 100 percent of required power from the distributed energy source. The distributed energy source can include energy storage (e.g., battery power) augmentation for additional peak power capability. Thus, the user does not rely on the public utility grid for normal operations.

Certain embodiments of the present invention provide a grid-linked power supply that allows for periodic maintenance of the fuel cell or other alternative energy source without interrupting power delivery. In preferred embodiments, the customer can prioritize usage of the grid versus usage of the energy storage device to provide a range of choice between battery life and grid independence. For example, the customer can use the utility grid before using a battery, resulting in longer battery life. Alternatively, the customer can use the battery before using the utility grid, providing the owner with the lowest possible electric utility bill, and greater independence from the grid.

Preferred embodiments of the invention provide a grid-linked power supply that is economical and efficient.

Certain embodiments of the present invention provide a grid-linked power supply topology, wherein the primary power producing means comprises at least one fuel cell, and/or other alternative energy source, which singly or in combination with each other or with a battery or other energy storage device such as a flywheel or ultra-capacitor, generate sufficient continuous power for normal demands of residential, commercial or industrial consumers. Fuel cells and/or other alternative energy sources decrease the emission of pollutants and, moreover, public utility power generating requirements. Furthermore, use of fuel cells and/or other alternative energy sources as a primary power producing means protects consumers against damage or loss resulting from power surges, dips, and/or outages, making the topology more reliable than the utility grid alone. The grid-linked power supply topology comprises further a connection to a public utility grid, which is connected to the direct current bus of the inverter rather than in parallel with the output of the inverter, to provide auxiliary power during infrequent, and unpredictable periods of peak, anomalous or abnormal demand. Connecting the utility grid to the direct current bus of the inverter, moreover, ensures that surplus power generated by the fuel cells, batteries, and/or other alternative energy sources is not generated into the utility grid, eliminating the potential for grid parallel operation and thus the costly and time-consuming grid interconnection application and approval processes. The GLPS controls the switching between the fuel cell, battery, and/or alternative energy source and the utility grid by providing a DC/DC converter for each GLPS energy source. Each converter produces a limited current and each converter has distinct voltage set points and, additionally, the grid voltage is provided with yet another voltage set point.

Using a utility grid to provide peak, anomalous and abnormal demand power ensures that fuel cells, batteries, and/or other alternative power sources are more efficiently designed and sized for normal power demands, which is to say that the primary distributed energy sources do not have to be sized for the worst case condition. Therefore, the present invention can provide power more economically. Moreover, using a utility grid to provide peak power demand ensures that peak power can be delivered, if necessary, for a longer period of time or, ideally, continuously. Hence, the invention disclosed herein can be more reliable than a grid parallel or grid independent system. As an example, if one defines normal continuous power as 1x, and defines an extended peak power as 2×normal power for a long time (>5 sec.) and a short peak power as 4×normal power for a short time (<5 sec.), the described present invention can provide extended peak operation. This capability can be enhanced with additional batteries and/or other energy storage elements, however such storage elements have limited energy storage and as such, cannot provide such power indefinitely. The present invention gives the systems integrator the ability to offer the tradeoff between shorter battery life and greater maintenance and reduced size and cost.

Other aspects and embodiments of the invention are discussed below. Moreover, additional advantages of the present invention will be apparent from the drawings and specifications that follow.

BRIEF DESCRIPTION OF THE DRAWING

For a fuller understanding of the nature and desired objects of the present invention, reference is made to the following detailed description taken in conjunction with the accompanying drawing figures wherein like reference characters denote corresponding parts throughout the several views and wherein.

DETAILED DESCRIPTION OF THE INVENTION INCLUDING THE PREFERRED EMBODIMENT

Figure 1:
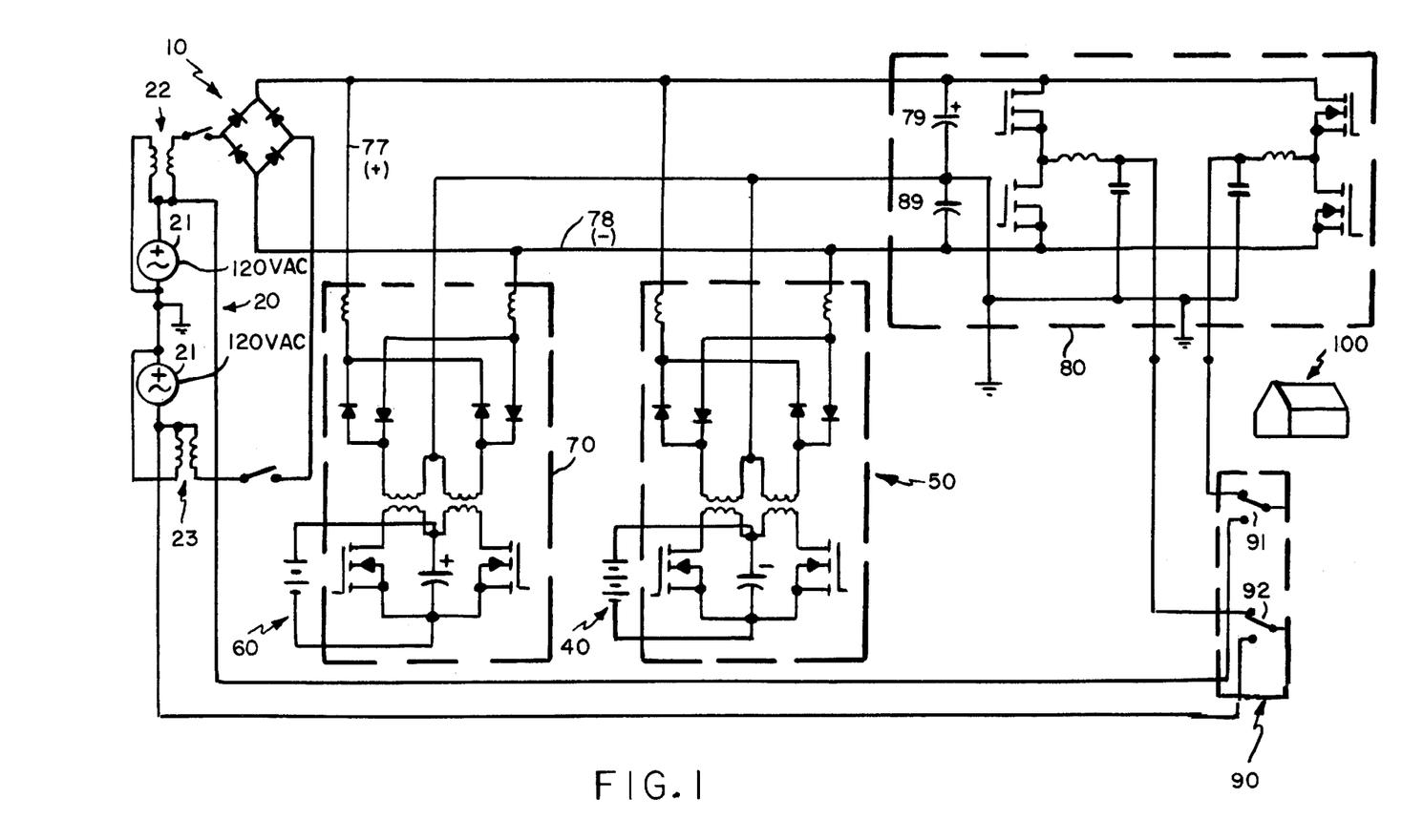
FIG. 1 is an embodiment of the grid-linked power supply topology.

Referring now to the various figures of the drawing wherein like reference characters refer to like parts, there is shown in FIG. 1 an embodiment of a grid-linked power supply topology 10, comprising a public utility grid 20, a battery 40 with a converter 50 that is controlled by a voltage set point and a current limit, a fuel cell 60 with a converter 70 that also is controlled by a voltage set point and a current limit, and an output inverter 80 that also is controlled by a voltage set point. The grid-linked power supply topology is connected through a transfer switch 90 to a load 100, e.g., a residential home, which is powered by standard split-phase 240/120 volt power. The present invention provides power from a plurality of sources: a fuel cell and/or other alternative energy source, a battery and/or other energy storage device, and a public utility grid.

In a preferred embodiment, the present invention provides power from a fuel cell, a battery, and a utility grid. However, other alternative energy sources, e.g., photovoltaic cells, wind turbines, etc. can be used singly or in any combination. Additionally, in place of the battery, other energy storage devices, e.g., flywheels, ultra-capacitors, etc. can be used singly or in any combination. Indeed, another useful embodiment of the present invention comprises a fuel cell or other alternative energy source and a utility grid without an energy storage device.

In one preferred embodiment, a fuel cell 60, which is among the most efficient power sources currently available, is the primary source of power delivered to the load of the grid-linked power supply topology 10. Fuel cells 60 chemically combine hydrogen and oxygen to create direct current (DC) electrical energy. Typically, and in the present invention, the fuel cell 60 is sized to provide continuous normal operation requirements. In a preferred embodiment, the fuel cell 60 produces about 100 volts, which, once stepped up provides a voltage to bias and hold the direct current buses 77, 78 to the inverter 80 at about 390 (+/−195) volts.

Figure 2:
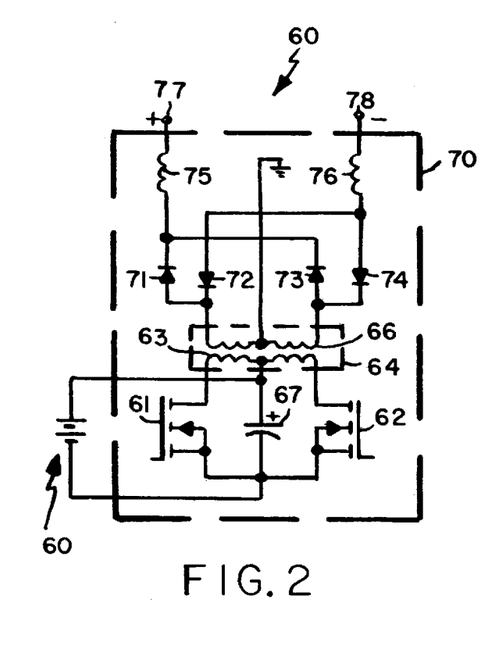
FIG. 2 is an embodiment of a fuel cell and direct current-to-direct current converter.

DC voltage from the fuel cell 60 is chopped into AC voltage by a pair of MOSFET transistors 61, 62. The AC voltage is applied to the primary winding of the transformer 64. The AC voltage passes through a primary transformer coil 63 to a secondary transformer coil 66, where it is stepped up, e.g., by a factor equal to the ratio of the number of turns on the secondary transistor coil 66 divided by the number of turns on the primary transistor coil 63. The ratio is chosen so that the output voltage relative to neutral is +/−195 volts at the lowest fuel cell operating voltage. In a preferred embodiment, the fuel cell minimum voltage is 73 volts, therefore, the transformer ratio is chosen to be 2.67. The stepped-up voltage from the transformer 64 then enters an AC/DC converter 70, where it is rectified by a plurality of diodes 71, 72, 73, 74, converting the voltage back to pulsating DC. The DC voltage pulses are filtered (smoothed) by two inductors 75, 75, one connected to each DC bus 77,78. The width of the voltage pulses are controlled to regulate the voltage on the DC bus 77, 78 and to limit the current supplied to the DC bus 77, 78.

The fuel cell converter controller 170 (FIG. 6) is operated by comparing the voltage command 210, which is shown at 390 volts, with the actual output voltage 215. The difference between the two values, if any, is applied to input of a proportional-plus-integrator controller 220. The output of the proportional-plus-integrator controller 220 is limited so that it cannot go below zero and, moreover, cannot exceed the value set by the current limiter function 225, which is shown for a limited current of 18 amperes. The current limiter 225 operates such that if current exceeds the set point, e.g., 18 amperes, the integrator 228 reduces the pulse width modulator 230 command to zero, effectively shutting off the converter 70. Moreover, if the current is less than the set point, e.g., 18 amperes, the full capacity of the converter 70 is available. The limited result is applied to the pulse width modulator 230 and converter 70.

Current, travelling on the direct current buses 77, 78, passes through a conventional inverter 80 that converts direct current to alternating current (AC) for use by the consumer. A double pole, double throw transfer switch 91, 92 couples the inverter 80 to the load 100.

Figure 4:
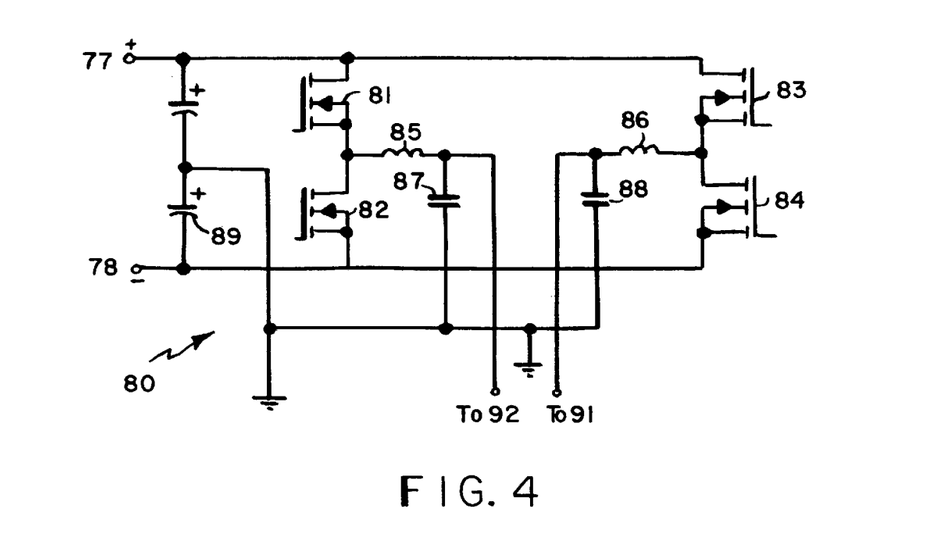
FIG. 4 is an embodiment of an inverter.

The inverter 80 (FIG. 4) comprises a plurality of insulated gate bipolar transistor (IGBT) switches 81, 82, 83, 84, inductors 85, 86 and capacitors 87, 88. The inverter controller controls the on and off time of the IGBT switches 81, 82, 83, 84 to modulate the pulse width of the output signal. Operation is such that only one of the switches of a switch pair is on at any one time, and then for only a very short time—called the "dead-time"—are both switches off simultaneously. As the pulse width is modulated, the duty cycle of the upper switches 81, 83 are varied from 0% to 100%, the opposite, lower switches 82, 84, operate inversely from the upper switches 81, 83, switching from 100% to 0% commensurately. Pulse width modulation (PWM) distributes output pulses over a number of fixed-length periods so that there is a single switching cycle per period. PWM, thus, generates a sequence of pulses with changing pulse widths that are determined by a modulating signal. The modulating signal is comprised primarily of a sinusoidal waveform at the desired output frequency, typically 60 Hz. Each switch pair modulates the pulse width on one phase of the two-phase AC output voltage. The resulting waveform output, at the midpoint of the two switches alternates between being connected to the positive bus 77, and the negative bus 78. This voltage waveform represents the desired 120 Volt, 60 Hz waveform that supplies power to the load. The switching voltage waveform output is filtered with an inductor 86, 86 and a capacitor 87, 88 to remove the high frequency component, and leave simply the average voltage, which is what is supplied to the load 100.

To regulate the output voltage 108 properly (FIG. 5), the inverter controller compensates the modulating signal for output voltage amplitude inequalities. A voltage command 95, shown as 120 volts RMS, is compared to the computed RMS 91 of the output voltage 108 going to the load 100, which is an alternating current signal at 60 Hertz. Any difference sends a signal that is processed slowly through a proportional-plus-integral control 96. The output signal of the proportional-plus-integral control 96 is then multiplied by an instantaneous voltage command 97, which produces a 60 Hertz sine wave.

Figure 5:
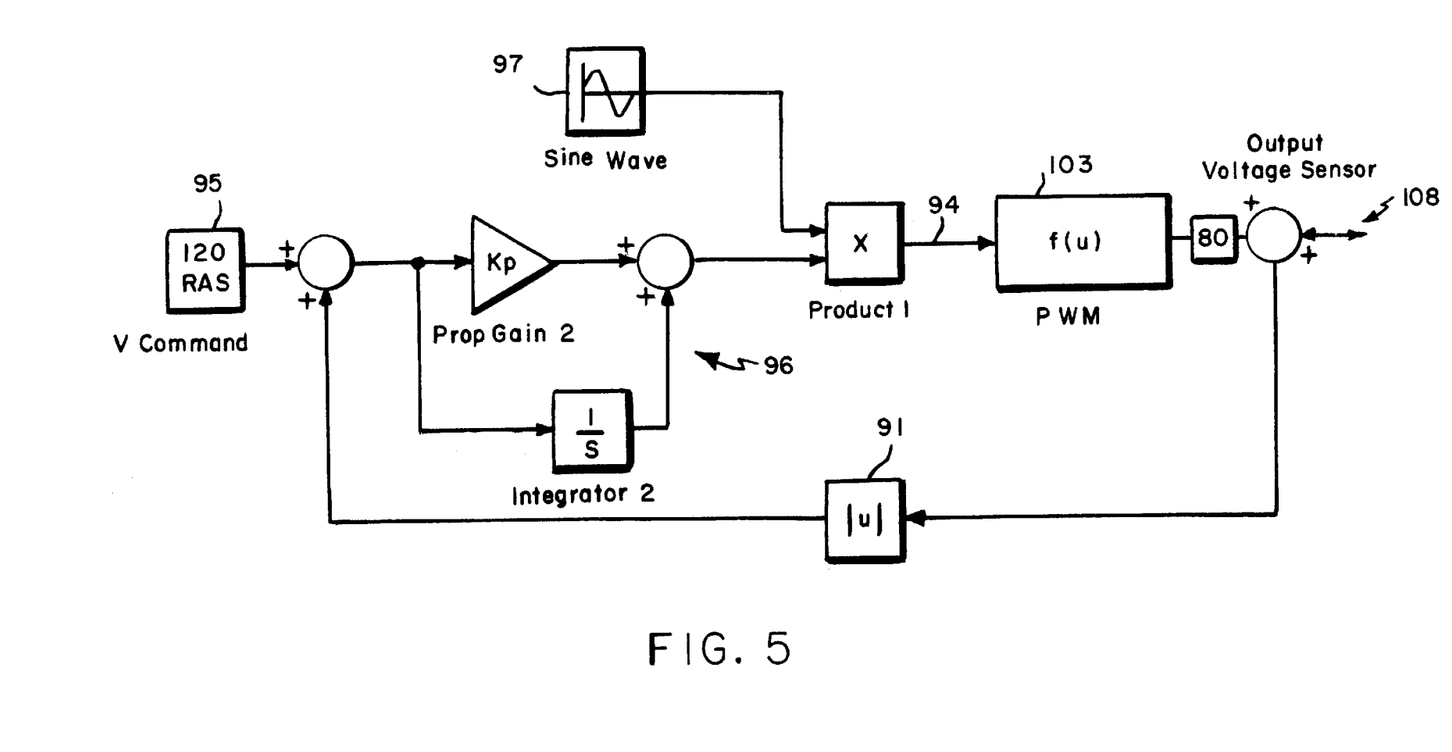
FIG. 5 is an embodiment of the alternating current compensator logic.

The results of the alternating current compensator 94 then undergoes pulse width modulation 103, whereby the inverter controller controls the on and off time of the switches 81, 82, 83, 84 to modulate the pulse width of the output signal.

Presently, fuel cells 60 suffer from a slow response to load 100 changes, limiting them to delivery of continuous power only. This slow response is primarily due to the hydrogen-producing mechanism of the fuel cell 60. The fuel cell reformer, which converts fossil fuel in the fuel cell 60 to hydrogen, must change its stoichiometric operating point (SOP) in order for the fuel cell to provide more power. This process currently takes several seconds.

In a preferred embodiment, a battery 40 (FIG. 3), e.g., a lead acid battery, a monopolar or bipolar lithium metal sulfide battery, or the like, responds to load demands that are high peak or abnormal until the fuel cell 60 has powered up to meet the load demand itself Typically, this takes several seconds. The battery 40 is sized to provide anomalous, peak power to which the fuel cell 60 cannot respond immediately, but can respond within design capabilities. In addition, the battery 40 can supply additional continuous power within the limits of its energy storage.

Figure 3:
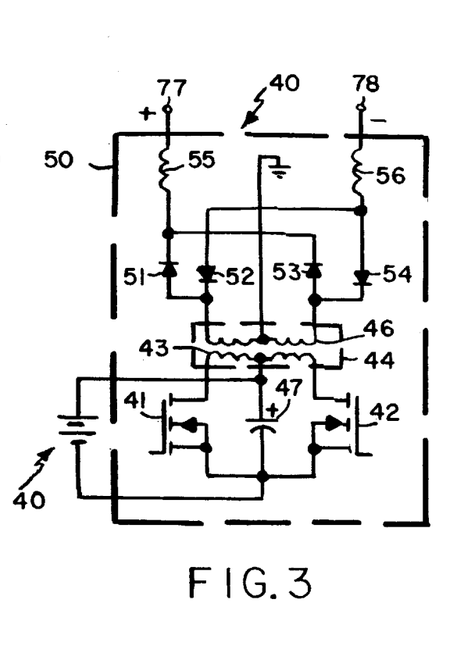
FIG. 3 is an embodiment of a battery and direct current-to-direct current converter.

DC voltage from the battery 40 is chopped into AC voltage by a pair of MOSFET transistors 41, 42. The AC voltage is applied to the primary winding of the transformer 44. The AC voltage passes through a primary transformer coil 43 to a secondary transformer coil 46, where it is stepped up, e.g., by a factor equal to the ratio of the number of turns on the secondary transformer coil 46 divided by the number of turns on the primary transformer coil 43. The ratio is chosen so that the output voltage relative to neutral is +/−195 volts at the lowest battery operating voltage. In a preferred embodiment, the battery minimum voltage is 35 volts, therefore the transformer ratio is chosen to be 5.5. The stepped-up voltage from the transformer 44 then enters an AC/DC converter 50, where it is rectified by a plurality of diodes 51, 52, 53, 54 converting the voltage back to pulsating DC. The DC voltage pulses are filtered, i.e., smoothed by two inductors 55, 56, one connected to each DC bus 77, 78. The width of the voltage pulses are controlled to regulate the voltage on the DC bus 77, 78, and to limit the current supplied to the DC bus 77, 78.

The battery converter controller 150 (FIG. 7) is operated by comparing the voltage command 110, which is shown at 380 volts, with the actual output voltage 115. The difference between the two values, if any, is applied to input of a proportional-plus-integrator controller 120. The output of the proportional-plus-integrator controller 120 is limited so that it cannot go below zero, and, moreover, cannot exceed the value set by the current limiter function 125, which is shown for a limited current of 26 amperes. The current limiter 125 operates such that if current exceeds the set point, e.g., 26 amperes, the integrator 128 reduces the pulse width modulator 130 command to zero, effectively shutting off the converter 50. Moreover, if the current is less than the set point, e.g., 26 amperes, the full capacity of the converter 50 is available. The limited result is applied to the pulse width modulator 130 and converter 50.

Figure 6:
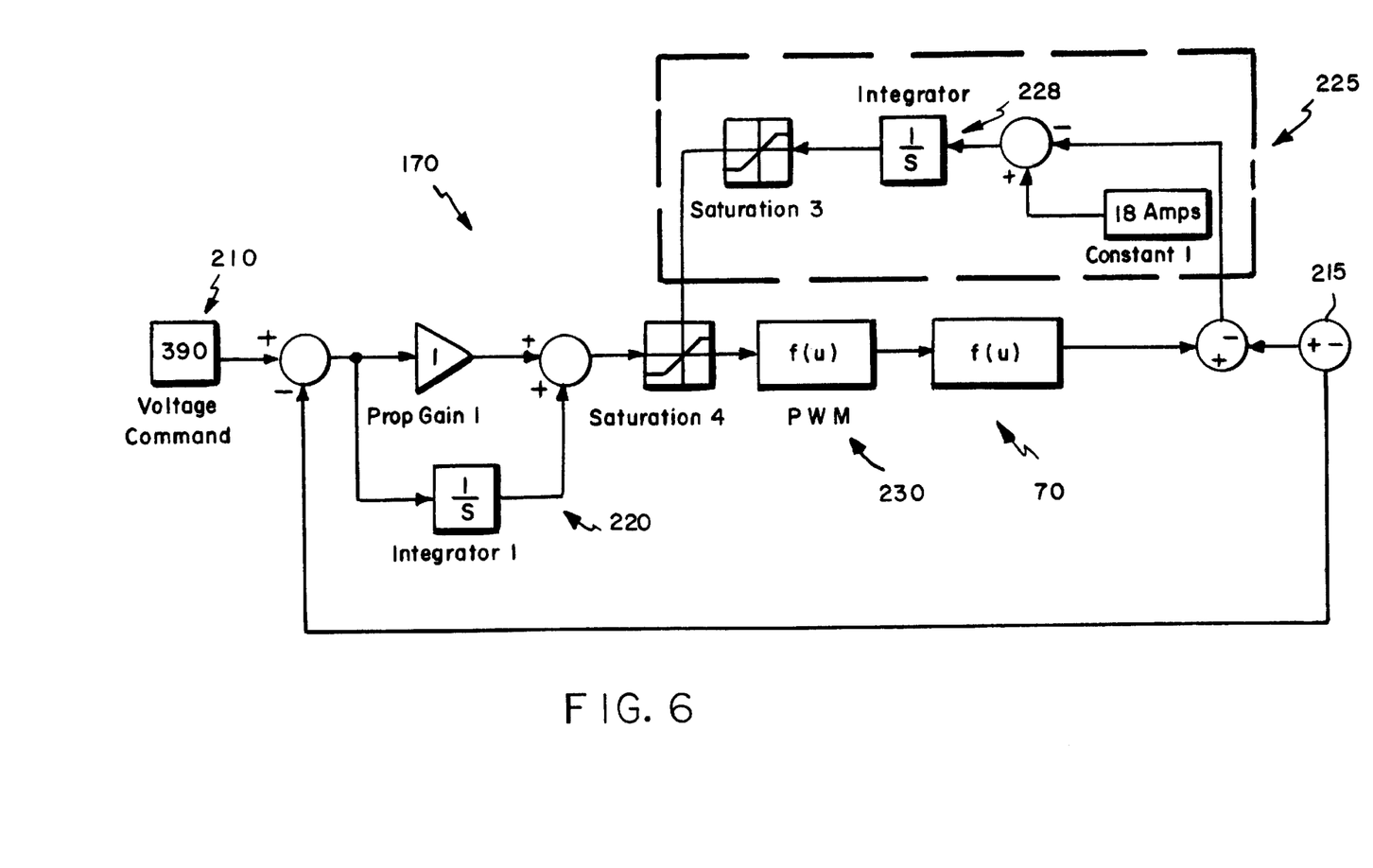
FIG. 6 is an embodiment of a converter controller for the fuel cell.
Figure 7:
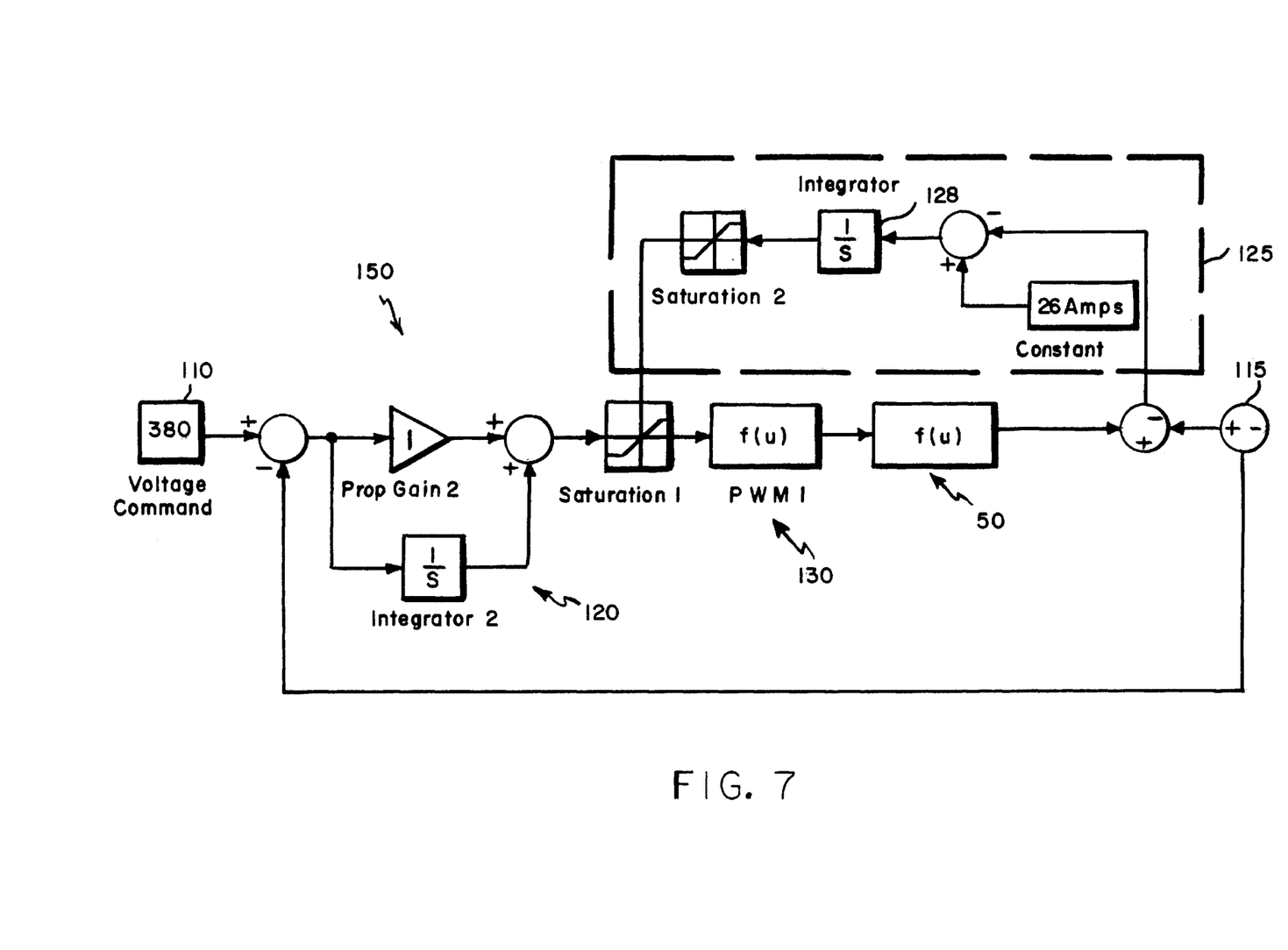
FIG. 7 is an embodiment of a battery converter controller.

The battery converter controller 150 regulates the voltage in the direct current buses 77, 78. Above about 380 volts, the fuel cell converter controller 170 is responsible for regulating the bus 77, 78 within its current limit. As the load 100 draws power from the inverter 80, the voltage in the direct current buses 77, 78 begins to decrease when the fuel cell converter controller 170 enters its current limit. When the bus voltage has decreased to or dropped below about 380 volt, the battery converter controller 150 senses the decrease and begins supplying battery power to the direct current buses 77, 78 until the fuel cell 60 has powered up to satisfy the demand, at which point the system switches back to a fuel cell 60 only mode. In a preferred embodiment, a 48-volt battery is used in parallel on the high voltage buses 77, 78 with a 100-volt fuel cell 60.

In a preferred embodiment, the utility grid 20 provides power to the grid-linked power supply topology 10 to satisfy peak, anomalous or abnormal demand. Typically, utility grids 20 produce alternating current (AC) power from a plurality of voltage supply sources 21. Current from the plurality of voltage sources 21 passes through a plurality of transformers 22, 23 which step up the voltage by about ten percent, which is to say voltage goes from about 120 volts RMS to about 132 volts RMS. Voltage from the transformers 22, 23 passes through a full-wave rectifier, which in the preferred embodiment is a diode bridge 25, which converts alternating current to direct current. The diode bridge 25 is coupled to the direct current buses 77, 78 of the grid-linked power supply circuit 10, in parallel with the outputs from the battery converter 50 and the fuel cell converter 70. The rectifier approach to grid-link is a simple, economical approach, yet it is not the only way to practice the invention claimed herein. Indeed, there are other electronic ways of converting the power, well known to those of ordinary skill in the art, which have the advantages of improved control for varying grid voltage, power factor correction at the input, and current limiting.

The converter controllers 150, 170 regulate the voltage in the direct current buses 77, 78 within their current limits above about 380 volts. When the current limits are reached, the bus voltage drops to about 372 volts or below, which is approximately equal the product of (i) the voltage coming from the transformer 44 (about 132 volts) and (ii) two times the square root of two (2√2), then the rectified grid-link starts supplying power to the DC buses 77, 78 until the DC bus voltage exceeds about 372 volts. Indeed, bias voltage above about 372 volts reverse biases the diodes in the diode bridge 25, preventing any current from the public utility grid 20 from entering the direct current buses 77, 78 until needed. Thus, load demand above about 372 volts is provided by the fuel cell 60 only or the fuel cell 60 in combination with the battery 40.

When the load 100 exceeds the capability of the fuel cell converter 70 and the battery converter 50, the system will begin to draw power from the public utility grid 20 and the inverter 80 will draw power from the public utility grid 20 until the peak, anomalous or abnormal demand abates. When the load demand decreases and the bias voltage in the direct current buses 77, 78 increases above about 372 volts, the diodes in the diode bridge 25 again become reverse biased by the bias voltage in the direct current buses 77, 78. The GLPS control switches back to a fuel cell 60 only mode, or to a fuel cell 60 in combination with a battery 40 mode. In an alternative configuration, the battery target voltage can be set to about 350 volts, in which case the battery 40 will not supply power to the DC bus 77, 78, until load on the utility grid 70 is great enough to draw its output voltage down to about 350 volts, or it becomes absent. In this mode of operation, battery life expectancy is maximized, by allowing the battery 40 to remain on float charge most of the time.

Although a preferred embodiment of the invention has been described using specific terms, such description is for illustrative purposes only, and it is to be understood that changes and variations may be made without departing from the spirit or scope of the following claims.

What is claimed is:

1. A grid-linked power supply, said power supply comprising:
   an inverter;
   at least one distributed energy source as a primary power source;
   a connection to a public utility grid to provide a complementary power source; and
   a controller for regulating delivery of power from said distributed energy source during normal power demand conditions and for mixing therewith power from said public utility grid during peak power demand conditions.

2. The grid-linked power supply as recited in claim 1, wherein the distributed energy source comprises a fuel cell.

3. The grid-linked power supply as recited in claim 1, wherein the distributed energy source is a device selected from the group consisting of a photovoltaic cell, a wind-powered turbine, a wave-powered generator, and a micro-turbine.

4. The grid-linked power supply as recited in claim 1, further comprising an energy storage device in combination with said distributed energy source.

5. The grid-linked power supply as recited in claims 4, wherein the energy storage device is a device selected from the group consisting of a battery, a flywheel, and an ultra-capacitor.

6. A topology for a grid-linked power supply that comprises a distributed energy source as a primary power source and a connection to a public utility grid, said topology comprising:

an inverter; and a DC/DC converter connected to the distributed energy source, said inverter and said converter connected by internal bus lines, wherein a bias voltage is provided to select drawing power from the distributed energy source during normal power demand conditions and, further, to mix therewith power from said public utility grid during peak power demand conditions.

7. The topology as recited in claim 6, wherein the grid-linked power supply further comprises an energy storage device in combination with said distributed energy source, said topology further comprising a second DC/DC converter connected to the energy storage device, wherein the bias voltage is provided to select drawing power from the distributed energy source or from the energy storage device during normal power demand conditions and, further, to mix therewith power from said public utility grid during peak power demand conditions.

8. A method of delivering electrical power to a user load, the method comprising:

providing a distributed energy source as a primary power source;

providing a connection to a public utility grid, which is coupled to an internal bus of a power supply in parallel with the primary power source, the power supply including an inverter and a DC/DC converter that is connected to the primary power source; and regulating the bias voltage on the bus so as to draw power from the primary power source during normal power demand conditions and, further, to mix therewith power from the public utility grid during peak power demand conditions.

9. The method of delivering electrical power as recited in claim 8, wherein the distributed energy source comprises a fuel cell.

10. The method of delivering electrical power as recited in claim 8, wherein the distributed energy source is a device selected from the group consisting of a photovoltaic cell, a wind-powered turbine, a wave-powered generator, and a micro-turbine.

11. The method of delivering electrical power as recited in claim 8, further comprising providing an energy storage device in combination with said distributed energy source.

12. The method of delivering electrical power as recited in claim 11, wherein the energy storage device is a device selected from the group consisting of a battery, a flywheel, and an ultra-capacitor.

13. The method of delivering electrical power as recited in claim 8, wherein the regulating step includes comparing a demand voltage with a set point.

14. The method of delivering electrical power as recited in claim 13, wherein the set point is selected from (i) a value for normal demand voltage, (ii) a value for a transitional demand voltage, and (iii) a value for a peak demand voltage.

15. The method of delivering electrical power as recited in claim 14, wherein the value for normal demand voltage is compared with a voltage from the distributed energy source.

16. The method of delivering electrical power as recited in claim 14, wherein the value for transitional demand voltage is compared with voltage from an energy storage device.

17. The method of delivering electrical power as recited in claim 14, wherein the value for peak demand voltage is compared with voltage from the public utility grid.

18. The method of delivering electrical power as recited in claim 14, wherein the value for the normal demand voltage is about 390 volts.

19. The method of delivering electrical power as recited in claim 14, wherein the value for the transitional demand voltage is about 380 volts.

20. The method of delivering electrical power as recited in claim 14, wherein the value for the peak demand voltage is about 372 volts.

* * * * *